(12) United States Patent
Hait

(10) Patent No.: US 8,032,440 B1
(45) Date of Patent: Oct. 4, 2011

(54) METHOD OF DETERMINING IMPLIED VOLATILITY FOR AMERICAN OPTIONS

(75) Inventor: David Hait, New York, NY (US)

(73) Assignee: Optionmetrics LLC, New York, NY (US)

( * ) Notice: Subject to any disclaimer, the term of this patent is extended or adjusted under 35 U.S.C. 154(b) by 1098 days.

(21) Appl. No.: 10/698,040

(22) Filed: Oct. 30, 2003

Related U.S. Application Data

(60) Provisional application No. 60/422,231, filed on Oct. 30, 2002.

(51) Int. Cl.
*G06Q 40/00* (2006.01)
(52) U.S. Cl. .................................. 705/36 R; 705/35
(58) Field of Classification Search ................. None
See application file for complete search history.

(56) References Cited

U.S. PATENT DOCUMENTS

| | | | | |
|---|---|---|---|---|
| 6,061,662 | A * | 5/2000 | Makivic | 705/36 R |
| 6,879,974 | B1 * | 4/2005 | Ninomiya et al. | 706/62 |

OTHER PUBLICATIONS

Widdicks, Martin et al., Convergence of Standard Lattice Methods for Option Pricing, 2002, The Journal of Futures Markets, vol. 22, No. 4, pp. 315-338.*
Breen, Richard, The Accelerated Binomial Option Pricing Model, Jun. 1991, Journal of Financial and Quantitative Analysis, vol. 26, No. 2, pp. 153-164.*
Rubinstein, Mark, Implied Binomial Trees, Jul. 1994. at http://haas.berkeley.edu/groups/finance.*
John C. Hull; Options, Futures, and Other Derivatives, Sixth Edition. Prentice Hall, Copyright 1993-2006; pp. 397-398.
Mark Broadie and Jerome Detemple; American Option Valuation: New Bounds, Approximations, and a Comparison of Existing Methods; The Review of Financial Studies Winter 1996 vol. 9, No. 4, pp. 1211-1250.

* cited by examiner

*Primary Examiner* — James Kramer
*Assistant Examiner* — Carol See
(74) *Attorney, Agent, or Firm* — Pearl Cohen Zedek Latzer, LLP

(57) ABSTRACT

A new computer-implemented method for determination of a financial index, namely, implied volatility for American options. The method involves the division of the period until option expiration into a series of sub-periods, and calculation of a node vega, the node vega being the exact derivative of the option price with respect to the volatility at the end of at least one of said subperiods.

26 Claims, 1 Drawing Sheet

FIG. 1

Eq. 5a:
$$\frac{\partial C_i}{\partial \sigma} = \left(\frac{1}{R}\right) \times \left[p \frac{\partial C_{i+1}^{up}}{\partial \sigma} + (1-p) \frac{\partial C_{i+1}^{down}}{\partial \sigma} + \left(C_{i+1}^{up} - C_{i+1}^{down}\right) \frac{\partial p}{\partial \sigma}\right]$$

Eq. 5b:
$$V_i = \left(\frac{1}{R}\right) \times \left[p V_{i+1}^{up} + (1-p) V_{i+1}^{down} + \left(C_{i+1}^{up} - C_{i+1}^{down}\right) \frac{\partial p}{\partial \sigma}\right]$$

i.e. $\frac{\partial C_i}{\partial \sigma}$ is computed from where the defn. of risk neutral probability $p$.

Eq. 6: $V_i = \frac{\partial S_i}{\partial \sigma}$

METHOD OF DETERMINING IMPLIED VOLATILITY FOR AMERICAN OPTIONS

RELATED APPLICATIONS

This application claims the benefit of U.S. Provisional Application Ser. No. 60/422,231 filed Oct. 30, 2002, which is fully incorporated herein by reference.

FIELD OF THE INVENTION

The present invention relates to a new method for determination of a financial index, namely, implied volatility for American options.

BACKGROUND OF THE INVENTION

Implied volatility is a quantity related to the price of a traded financial option to buy ("call" option) or to sell ("put" option) a particular asset. Specifically, implied volatility represents the market's estimate of the future price volatility of the underlying asset. According to results of Black and Scholes, the market price of an option depends solely on the asset's future price volatility, the current price of the underlying asset, the risk-free interest rate, the dividend yield (if any) from the underlying asset, the exercise price of the option, and the time to expiration.

In the case of "European" options (options which can only be exercised at expiration), Black and Scholes present a formula for the calculation of the fair market price of the option given its volatility and other inputs. Subsequent researchers showed how this formula could be inverted, essentially solving for the volatility using the other inputs and the current market price of the option. This value is referred to as implied volatility, and is used by options traders as an indication of the relative value of an option, in much the same way that yield serves as a measure of the relative value of a bond. An equivalent Black-Scholes type formula does not exist for American options.

Option pricing and implied volatility are known in the art, and further discussion of them provided in the following publications, all of which are fully incorporated herein by reference: Black, F. and M. Scholes, 1973, "The Pricing of Options and Corporate Liabilities", Journal of Political Economy, 81, 637-654; Cox, J. C., S. A. Ross, and M. Rubinstein, 1979, "Option Pricing: A Simplified Approach", Journal of Financial Economics, 7, 229-263; Cox, J. C., and M. Rubinstein, 1985, "Options Markets", Prentice-Hall, Englewood Cliffs, N.J.; and Latane, H., and R. Rendleman, Jr., 1976, "Standard Deviation of Stock Price Ratios Implied in Option Prices", Journal of Finance, 31, 369-382.

SUMMARY OF THE INVENTION

It is an object of the present invention to provide a new method for use in determining implied volatility.

Further to the invention, a new method is provided for determining vega. Preferably, the method is computer-implemented, using any desired computing device, whether a desktop, notebook, handheld computer, or so forth.

BRIEF DESCRIPTION OF THE FIGURES

FIG. 1 sets forth a method for calculation of the node vega in accordance with the present invention, wherein equations (5a) and (5b) show calculation of the "node vega" if no early exercise occurs at the node, and equation (6) sets forth the node vega if early exercise occurs at the node.

DETAILED DESCRIPTION OF THE INVENTION AND THE PREFERRED EMBODIMENTS

As is known in the art, an "American" option is an option which can be exercised prior to expiration. As noted above, an equivalent Black-Scholes type formula does not exist for American options. Instead, they are generally priced using a industry-standard Cox-Ross-Rubinstein (CRR) binomial tree model. This model can accommodate underlying securities with either discrete dividend payments or a continuous dividend yield.

In the framework of the CRR model, the time between now and option expiration is divided into N sub-periods. Over the course of each sub-period, the security price is assumed to move either "up" or "down". The size of the security price move is determined by the volatility and the size of the sub-period. Specifically, the security price at the end of sub-period i is given by one of the following:

$$S_{i+1}^{up} = S_i u = S_i \exp(\sigma\sqrt{h}) \qquad \text{Equation (1)}$$

$$S_{i+1}^{down} = S_i d = S_i \exp(-\sigma\sqrt{h}) \qquad \text{Equation (2)}$$

where $h = T/N$ is the size of the sub-period, and $S_i$ is the security price at the beginning of the sub-period, $S_{i+1}^{up}$ is the security price in the event of an up move over the sub-period i, and $S_{i+1}^{down}$ is the security price in the event of an down movement over the sub-period i, and $\sigma$ is the volatility.

The price of a call option at the beginning of each sub-period is dependent on its price at the end of the sub-period, and is given by:

$$Ci = \max\{[pC_{i+1}^{up} + (1-p)C_{i+1}^{down}]/RSi - K\} \qquad \text{Equation (3)}$$

and likewise for a put option. Here, r is the interest rate, q is the continuous dividend yield (if the security is an index), $R = \exp([r-q]h)$, and $C_{i+1}^{up}$ and $C_{i+1}^{down}$ are the price of the option at the end of the sub-period, depending on whether the security price moves "up" or "down", and K is the option strike price. The "risk-neutral" probability p is given by:

$$p = \frac{R-d}{u-d} \qquad \text{Equation (4)}$$

where u and d are as defined above in Equations (1) and (2).

To use the CRR approach to value an option, we start at the current security price S and build a "tree" of all the possible security prices at the end of each sub-period, under the assumption that the security price can move only either up or down:

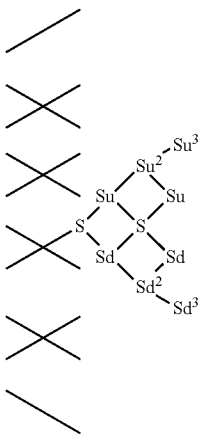

The tree is constructed out to time T (option expiration).

Next, the option is priced at expiration by setting the option expiration value equal to the exercise value: $C=\max(S_T-K,0)$ and $P=\max(K-S_T,0)$, where $S_T$ is the stock value at time T (option expiration), and dependent on the node. The option price at the beginning of each sub-period is determined by the option prices at the end of the sub-period, using the formula above. Working backwards, the calculated price of the option at time i=0 is the theoretical model price.

The CRR model is adapted to securities that pay discrete dividends as follows: When calculating the price of the option from equation (1), the security price $S_i$ used in the equation is set equal to the original tree price $S_i^0$ minus the sum of all dividend payments received between the start of the tree and time i. Under the constant dividend yield assumption, this means that the security price $S_i$ used in equation (1) should be set equal to $S_i^0(1-n\delta)$, where $S_i^0$ is the original tree price, $\delta$ is the dividend yield, and n is the number of dividend payments received up to time i. All other calculations are the same.

The CRR model usually requires a very large number of sub-periods to achieve good results (typically, N>1000), and this often results in a large computational requirement.

To compute the implied volatility of an option given its price, a model such as CRR is run iteratively with new values of σ until the model price of the option converges to its market price, defined as the midpoint of the option's best closing bid and best closing offer prices. At this point, the final value of σ is the option's implied volatility. A numerical optimization technique such as Newton-Raphson is typically used for this calculation. For Newton-Raphson as well as other optimization algorithms, an important input is the option's vega (sometimes called kappa), defined as the partial derivative of the option's price with respect to the volatility. The vega cannot be calculated directly from the CRR model however, so it must be approximated by "tweaking" the model. In this approach, the CRR model is run twice, once using the current value of volatility and once using this same value of volatility increased by a small amount (the "tweak"). Thus for each iteration two values of the option price are calculated. The difference between these two values divided by the amount of the "tweak" is approximately equal to the vega of the option. This vega value, as well as the current volatility estimate and the calculated option price, are fed into the optimization algorithm, and a new volatility estimate is generated; this loop continues until the calculated option price equals the targeted market price.

Because of the "tweaking", each iteration in the calculation of implied volatility typically requires two separate CRR calculations in the method of the prior art.

In accordance with the present invention, an improved method is provided for determining vega. Preferably, the method is computer-implemented, with vega being calculated using any desired computing device, whether a desktop, notebook, handheld computer, or so forth.

In the method of the invention, at each node of the CRR tree, two values are calculated: $C_i$, the option price at that stage of the tree, and $V_i$, the node vega, which is the exact derivative of the option price with respect to the volatility at that particular stage of the tree. This approach allows the vega to be calculated at the same time that the option price is calculated. Although more calculation is required at each node, the whole calculation takes significantly less time than running the entire CRR model twice for each iteration. In addition, the calculated vega is exactly equal to the derivative of the CRR option price with respect to the volatility, rather than an approximation from "tweaking", so the implied volatility optimization algorithm has more exact inputs and thus converges faster.

The "node vega" is calculated according to the expression in Equation (5b) (assuming that no early exercise occurs at the node) of FIG. 1, $$Vi = \left(\frac{1}{R}\right) \times \left[pV_{i+1}^{Up} + (1-p)V_{i+1}^{DOWN} + (C_{i+1}^{UP} - C_{i+1}^{DOWN})\frac{\partial p}{\partial \sigma}\right]$$

where $\partial p/\partial \sigma$ is computed from the definition of risk neutral probability "p", where $C^{up}_{i+1}$ is the "up" node option price at the end of the subperiod, $C^{down}_{i+1}$ is the "down" node option price at the end of the subperiod, $V^{up}_{i+1}$ and $V^{down}_{i+1}$ are the up and down vegas at the end of the subperiod, and p is the "risk neutral probability". If early exercise occurs at the node, the vega at the node is given by Equation (6), $Vi=\partial Si/\partial\sigma$ where S is the stock price at the node, where the stock price assigned to a particular node is indirectly a function of the volatility. This approach allows the vega to be calculated at the same time that the option price is calculated.

If desired, the implied volatility can be computed using this method for both puts and calls across a range of different strike prices. Experience has shown that the implied volatility commonly varies across this range. Likewise, the present method can be used to plot the "volatility smile" (a graph of the implied volatility against the strike price), and can also be used as an improved method to determined the presence of a "volatility skew" (a difference between the implied volatilities using equal out of the money calls and puts). Some options trading is based on interpretation of such skew, and can be conducted more effectively using the method of the present invention. For example, high skew ratios can indicate that demand is increasing for puts, and so forth. In accordance with the invention, the computing device and associated software can provide data on the volatility smile, the volatility skew, and likewise with any other desired tool for analysis used by those in the art of options trading.

In further embodiments of the invention, the present new method of calculating vega is used in other options related applications as well. Thus, it applies not only to the CRR model, but to all tree-based and grid-based models of calculating option prices. Likewise, the calculations set forth above can be conducted at any point in a sub-period consistent with the invention, whether at the beginning or end or a sub-period.

Having described this invention with regard to specific embodiments, it is to be understood that the description is not meant as a limitation since further embodiments, modifications and variations may be apparent or may suggest themselves to those skilled in the art. It is intended that the present application cover all such embodiments, modifications and variations.

I claim:

1. A machine comprising:
a computing device for determining an implied volatility of an American option, wherein said device is configured to:
generate a tree having a plurality of nodes, each node corresponding to a different sub-period of time during which the American option can be exercised prior to the time when the option expires;
compute a value for node vega at each node of the tree for the corresponding sub-period of time using a single value of volatility that is the same for all nodes in the tree;
compute a value for vega for the tree using the values for node vega computed at the nodes; and
compute a value for the implied volatility of the American option using the value of vega computed for the tree.

2. The machine of claim 1, wherein the computing device is configured to compute the value for node vega at a node as the exact derivative of the option price with respect to the volatility when the option is not exercised at the sub-period of time corresponding to the node.

3. The machine of claim 2, wherein said computing device is configured to compute, when the option is not exercised at a sub-period of time i corresponding to a node, the value for node vega at the node as:

$$\frac{\partial C_i}{\partial \sigma} = \left(\frac{1}{R}\right) \times \left[p \frac{\partial C_{i+1}^{UP}}{\partial \sigma} + (1-p) \frac{\partial C_{i+1}^{DOWN}}{\partial \sigma} + (C_{i+1}^{UP} - C_{i+1}^{DOWN}) \frac{\partial p}{\partial \sigma}\right],$$

where $C_{i+1}^{UP}$ and $C_{i+1}^{DOWN}$ are the option prices at the end of the sub-period i when the price moves up and down, respectively, $\sigma$ is volatility, p is a risk-neutral probability, and R=exp([r−q]h), where h is the size of the sub-period of time i, r is the interest rate and q is the continuous dividend yield.

4. The machine of claim 1, wherein the computing device is configured to compute the value for node vega at a node as a function of a security price of the option when the option is exercised at a sub-period of time corresponding to the node.

5. The machine of claim 4, wherein the security price of the option is an index price of the option.

6. The machine of claim 4, wherein said computing device is configured to compute, when the option is exercised at a sub-period of time i corresponding to a node, the value for node vega at the node as $$\frac{\partial C_i}{\partial \sigma} = \frac{\partial S_i}{\partial \sigma},$$

where $S_i$ is the security price at the beginning of the sub-period of time i and $\sigma$ is volatility.

7. The machine of claim 1, wherein said computing device is configured to compute the value for the implied volatility of the American option iteratively using new values for node vega in each iteration until the computed price of the American option converges to the market price of the American option.

8. The machine of claim 7, wherein said computing device is configured to compute the value for the implied volatility in each iteration using the Newton-Raphson method.

9. The machine of claim 1, wherein said computing device is configured to compute the price of the option at each node at the same time as the computing device computes the value of node vega at the node.

10. The machine of claim 1, wherein said machine is configured to compute a value for vega for the tree recursively using values for node vega computed at the nodes.

11. The machine of claim 10, wherein said machine is configured to compute a value for vega for the tree using a recursive function of the values for node vega computed at the nodes,
wherein, when the option is not exercised at a sub-period of time i corresponding to a node the recursive function is $$\frac{\partial C_i}{\partial \sigma} = \left(\frac{1}{R}\right) \times \left[p \frac{\partial C_{i+1}^{UP}}{\partial \sigma} + (1-p) \frac{\partial C_{i+1}^{DOWN}}{\partial \sigma} + (C_{i+1}^{UP} - C_{i+1}^{DOWN}) \frac{\partial p}{\partial \sigma}\right],$$

where $C_{i+1}^{UP}$ and $C_{i+1}^{DOWN}$ are the option prices at the end of the sub-period i when the price moves up and down, respectively, $\sigma$ is volatility, p is a risk-neutral probability, and R=exp([r−q]h), where h is the size of the sub-period of time i, r is the interest rate and q is the continuous dividend yield, and
wherein, when the option is exercised at a sub-period of time i corresponding to a node, the recursive function is $$\frac{\partial C_i}{\partial \sigma} = \frac{\partial S_i}{\partial \sigma},$$

where $S_i$ is the security price at the beginning of the sub-period of time i and $\sigma$ is volatility.

12. The machine of claim 1, wherein said computing device is configured to compute a value for the option price at each node and the value for node vega for the corresponding sub-period of time using the option price of a node corresponding to a subsequent period of time.

13. A method for determining an implied volatility of an American option, wherein said method comprises:
generating a tree having a plurality of nodes, each node corresponding to a different sub-period of time during which the American option can be exercised prior to the time when the option expires;
computing a value for node vega at each node of the tree for the corresponding sub-period of time using a single value of volatility that is the same for all nodes in the tree;
computing a value for vega for the tree using the values for node vega computed at the nodes; and
computing a value for the implied volatility of the American option using the value of vega computed for the tree
wherein each of the computing steps is performed by a computing device.

14. The method of claim 13, wherein the value for node vega at a node is computed as the exact derivative of the option price with respect to the volatility when the option is not exercised at the sub-period of time corresponding to the node.

15. The method of claim 14, wherein, when the option is not exercised at a sub-period of time i corresponding to a node, the value for node vega at the node is computed as:

$$\frac{\partial C_i}{\partial \sigma} = \left(\frac{1}{R}\right) \times \left[p \frac{\partial C_{i+1}^{UP}}{\partial \sigma} + (1-p) \frac{\partial C_{i+1}^{DOWN}}{\partial \sigma} + (C_{i+1}^{UP} - C_{i+1}^{DOWN}) \frac{\partial p}{\partial \sigma}\right],$$

where $C_{i+1}^{UP}$ and $C_{i+1}^{DOWN}$ are the option prices at the end of the sub-period i when the price moves up and down, respectively, σ is volatility, p is a risk-neutral probability, and R=exp([r−q]h), where h is the size of the sub-period of time i, r is the interest rate and q is the continuous dividend yield.

16. The method of claim 13, wherein the value for node vega at a node is computed as a function of a security price of the option when the option is exercised at a sub-period of time corresponding to the node.

17. The method of claim 16, wherein the security price of the option is an index price of the option.

18. The method of claim 16, wherein, when the option is exercised at a sub-period of time i corresponding to a node, the value for node vega at the node is computed as $$\frac{\partial C_i}{\partial \sigma} = \frac{\partial S_i}{\partial \sigma},$$

where $S_i$ is the security price at the beginning of the sub-period of time i and σ is volatility.

19. The method of claim 13, wherein computing the value of the implied volatility of the American option comprises iteratively computing new values for node vega at the nodes in each iteration until the computed price of the American option converges to the market price of the American option.

20. The method of claim 19, wherein the value of the implied volatility is computed iteratively using the Newton-Raphson method.

21. The method of claim 13, further comprising computing the price of the option at each node at the same time as the value for node vega is computed for the node.

22. The method of claim 13, wherein said computing of a value for vega for the tree is conducted recursively using values for node vega computed at the nodes.

23. The method of claim 22, wherein said computing of a value for vega for the tree is conducted using a recursive function of the values for node vega computed at the nodes, wherein when the option is not exercised at a sub-period of time i corresponding to a node the recursive function is $$\frac{\partial C_i}{\partial \sigma} = \left(\frac{1}{R}\right) \times \left[p \frac{\partial C_{i+1}^{UP}}{\partial \sigma} + (1-p) \frac{\partial C_{i+1}^{DOWN}}{\partial \sigma} + (C_{i+1}^{UP} - C_{i+1}^{DOWN}) \frac{\partial p}{\partial \sigma}\right],$$

where $C_{i+1}^{UP}$ and $C_{i+1}^{DOWN}$ are the option prices at the end of the sub-period i when the price moves up and down, respectively, σ is volatility, p is a risk-neutral probability, and R=exp([r−q]h), where h is the size of the sub-period of time i, r is the interest rate and q is the continuous dividend yield, and wherein, when the option is exercised at a sub-period of time i corresponding to a node, the recursive function is $$\frac{\partial C_i}{\partial \sigma} = \frac{\partial S_i}{\partial \sigma},$$

where $S_i$ is the security price at the beginning of the sub-period of time i and σ is volatility.

24. The method of claim 13, further comprising the step of computing a value for the option price at each node and wherein the value for the node vega for a sub-period of time is computed using the option price of a node corresponding to a subsequent period of time.

25. A machine comprising:
a computing device for determining implied volatility of an American option, wherein said device is configured to:
iteratively generate a new tree for each new value of volatility, the tree having a plurality of nodes, each node corresponding to a different sub-period of time during which the American option can be exercised prior to the time when the option expires;
calculate a value of vega for each tree using values of the option price calculated at nodes of a single tree using a single value of volatility that is the same for all nodes in the single tree; and,
calculate the value of the implied volatility of the option using the values calculated for vega for the trees.

26. The machine of claim 25, wherein said computing device is configured to iteratively calculate the value of the implied volatility of the American option using the values calculated for vega for the trees, using the Newton-Raphson method.

* * * * *